(12) United States Patent
Lo

(10) Patent No.: US 6,791,478 B2
(45) Date of Patent: Sep. 14, 2004

(54) INTEGRATED CIRCUIT DEVICE FOR A WIRELESS KEYBOARD ARRAY

(76) Inventor: Chih-Jen Lo, P.O. Box No. 6-57, Chung-Ho, Taipei (TW)

( * ) Notice: Subject to any disclaimer, the term of this patent is extended or adjusted under 35 U.S.C. 154(b) by 497 days.

(21) Appl. No.: 09/983,844

(22) Filed: Oct. 26, 2001

(65) Prior Publication Data

US 2003/0080879 A1 May 1, 2003

(51) Int. Cl.[7] .............................................. H03M 11/00
(52) U.S. Cl. ........................... 341/22; 341/26; 341/176; 345/168; 710/15
(58) Field of Search .............................. 341/20, 22, 26, 341/176; 345/168; 359/142; 340/825, 69, 72; 710/15

(56) References Cited

U.S. PATENT DOCUMENTS

| | | | | |
|---|---|---|---|---|
| 5,925,110 A | * | 7/1999 | Klein | ........................... 710/15 |
| 6,031,470 A | * | 2/2000 | Asari et al. | .................... 341/22 |
| 6,243,035 B1 | * | 6/2001 | Walter et al. | ................ 341/176 |
| 6,295,002 B1 | * | 9/2001 | Fukuda | ..................... 340/636.1 |
| 6,509,845 B1 | * | 1/2003 | Tanaka | ........................ 341/22 |
| 6,522,283 B1 | * | 2/2003 | Shiga et al. | ................ 341/176 |
| 6,597,292 B1 | * | 7/2003 | Shigyo | .................. 340/825.69 |

* cited by examiner

Primary Examiner—Albert K. Wong

(57) ABSTRACT

The present invention relates to an integrated circuit (IC) device for a wireless keyboard array that concentrates the circuital functionalities of an oscillation circuit, a transmission/receiving circuit, an array detector, a signal processor, a coder, a decoder, an array decoder, et cetera, to be manufactured as a wireless keyboard array IC to enable the keyboard simultaneously to simultaneously conduct the code transmission and the receiving of the decoding as well as output the signal data keyed in from the keyboard to a keyboard controller by the method of serialization and via the emitting circuit and receiving circuit, then the keyboard controller transmits the signal data into a computer for increasing the practical value of the economic efficiency.

2 Claims, 3 Drawing Sheets

INTEGRATED CIRCUIT DEVICE FOR A WIRELESS KEYBOARD ARRAY

BACKGROUND OF THE INVENTION

1) Field of the Invention

The present invention provides an integrated circuit (IC) device for a wireless keyboard array, more specifically, the circuital functionalities of an oscillation circuit, a transmission/receiving circuit, an array detector, a signal processor, a coder, a decoder, an array decoder, et cetera, are concentrated and manufactured as a wireless keyboard array IC for increasing the practical value of the economic efficiency.

2) Description of the Prior Art

Accordingly, most of the general computer keyboards use a wired connector directly plugged onto a communication port of a computer to transmit the signal data keyed in from the keyboard into the computer via the keyboard communication port to make the computer operate.

Although the wired keyboard can control the computer, the keyboard controllers of the wired keyboards made by different manufactories have different regulations and that tends to trouble the user in making selection; furthermore, when the user is operating the computer, frequently the connector of the connecting wire separates from the communication port of the computer keyboard to disable the operation of the computer; therefore, some industrials researched and developed a wireless keyboard to improve the shortcoming of the wired keyboard.

That patented invention mainly has an infrared emitting and receiving module disposed in a keyboard and a computer respectively, wherein the infrared emitting and receiving module comprises a matrix circuit composed by a plurality of intersected longitudinal and horizontal axels; every key on the keyboard is arranged on the matrix circuit; every intersecting point of a longitudinal and a horizontal axels is a location of a press key; a code and decode switch is composed by a 6-byte switch; the on/off of the switch makes the coding action; a microprocessor is a controlling portion and that codes and decodes the transmitted information, scans the matrix circuit, transmits the information to the infrared emitting circuit and receives the signal transmitted by a infrared receiving circuit; an infrared emitting circuit emits the signal to an infrared emitting and receiving circuit of a computer; an infrared receiving circuit receives the signal from an infrared emitting and receiving module of a computer; the infrared emitting and receiving module of a computer comprises a connecting plug which is a connector for connecting the computer and the infrared emitting and receiving module; a code and decode switch is composed by a 6-byte switch; the on/off of the switch makes the coding action; a microprocessor is a controlling portion and that codes and decodes the transmitted information, scans the matrix circuit, transmits the information to the infrared emitting circuit and receives the signal transmitted by a infrared receiving circuit; an infrared emitting circuit emits the signal to an infrared emitting and receiving circuit of a keyboard; an infrared receiving circuit receives the signal from an infrared emitting and receiving module of a keyboard; a wireless keyboard is composed thereby according to the relative operations of the said units and circuits.

Although the said patented invention improves the shortcoming of the wired keyboard, the code and decode switch of the keyboard and the computer is comprised by many electric parts and the welding procedure tends to damage the parts; that is labor and time consuming and it also increases the material cost; furthermore, the said code and decode switch has only 6 bytes, therefore, the number of the combinations is relatively less and that reduces the data transmission.

There is another patented invention comprising a key array for keying in the signal keyed in by an user's key; a first central processing unit for distinguishing the user command key provided by the said key array as a key data signal; a switch generates emit frequency signal corresponding to the said key date signal output from the said central processing unit; an emit frequency signal generator receives the said key data signal and generates the said emit frequency signal; an emit antenna emits the said emit frequency signal; a keyboard receiver receives the said emit frequency signal from the keyboard emitter; after being generated correspondingly to the user's keyed in command, the said key data is provided to the said computer; a wireless keyboard is thereby composed by the relative operations of the said units and circuits.

Although the said patented invention can improve the shortcoming of the wired keyboard, most of the units and circuits are comprised by many electric parts and the welding procedure is labor and time consuming, it also increases the material cost.

In view of the mentioned reasons, the inventor of the present invention, based on the experience obtained from engaging in the related industry for many years and the professional techniques, researched, developed and accomplished the present invention of an integrated circuit device for a wireless keyboard array.

SUMMARY OF THE INVENTION

The present invention mainly concentrates and manufactures the circuital functionality of an oscillation circuit, a transmission/receiving circuit, an array detector, a signal processor, a coder, a decoder, an array decoder, et cetera, inside a wireless keyboard as a wireless keyboard array integrated circuit (IC).

The primary objective of the present invention is to use a wireless keyboard array IC to simultaneously conduct code transmission and receiving the decoding as well as output the signal data keyed in from the keyboard to a keyboard controller by the method of serialization and via the emitting circuit and receiving circuit, then the keyboard controller transmits the signal data into a computer, without being limited by different keyboard controller.

The secondary objective of the present invention is to reduce the labor time and material cost.

To enable a further understanding of the functionality, the structure and the features of the present invention, the brief description of the drawings below is followed by the detailed description of the preferred embodiment.

DETAILED DESCRIPTION OF THE PREFERRED EMBODIMENTS

Figure 1:
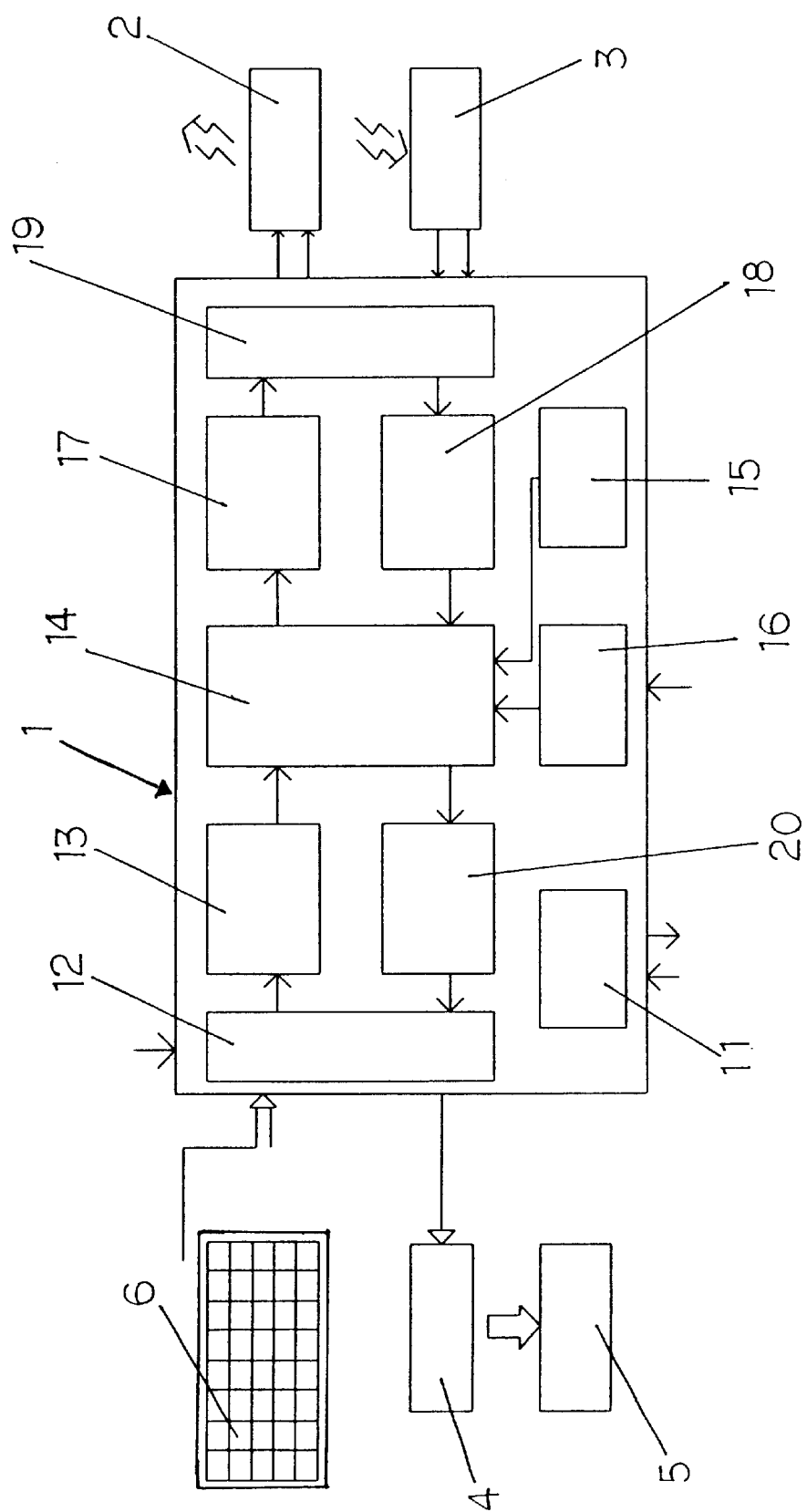
FIG. 1 is a circuit flow chart of the present invention.
Figure 2:
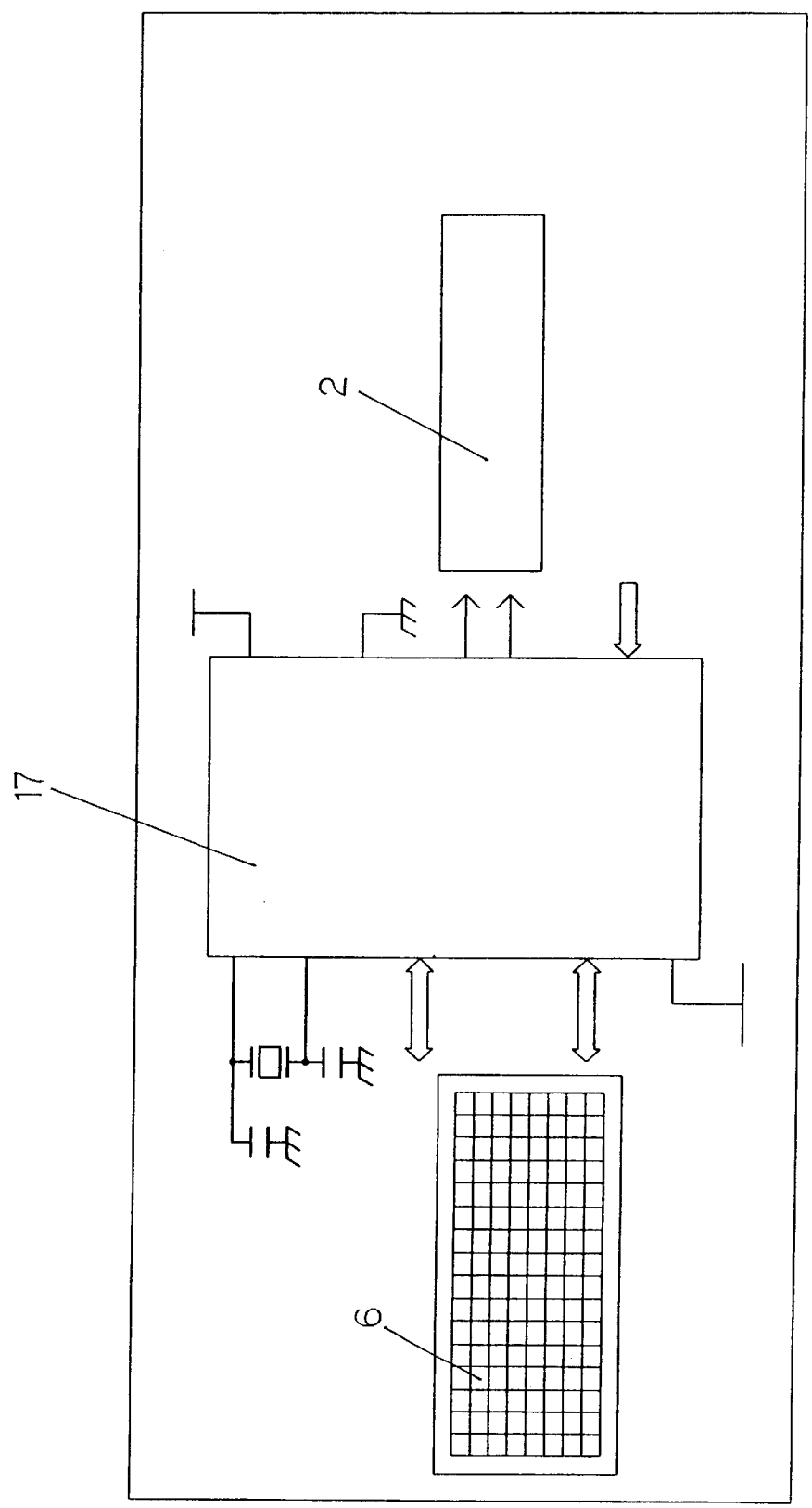
FIG. 2 is a drawing of the relationship between a coder and a keyboard of the present invention.
Figure 3:
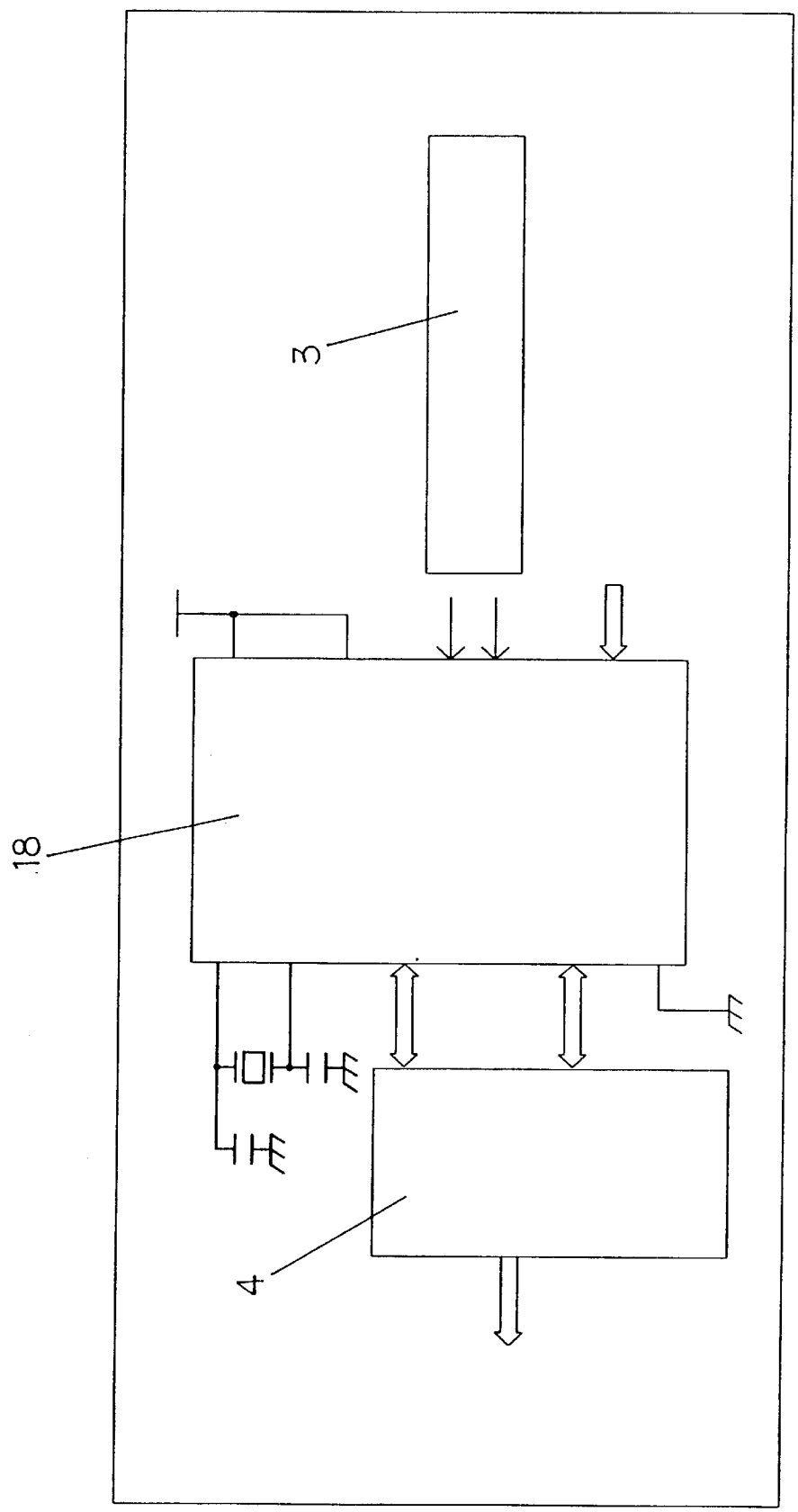
FIG. 3 is a drawing of the relationship between a decoder and a keyboard controller of the present invention.

Referring from FIGS. 1 to 3, the present invention has a wireless keyboard array integrated circuit (IC) (1) installed inside a keyboard (6) to enable the keyboard (6), mainly via a wireless keyboard array IC (1), to conduct code transmission and receiving the decoding as well as output the signal data keyed in from the keyboard (6) to a keyboard controller (4) by the method of serialization and via the emitting circuit (2) and receiving circuit (3), then the keyboard controller (4) transmits the signal data into a computer (5); the followings are comprised inside the said wireless keyboard array integrated circuit (IC) (1):

an oscillation circuit (11) controls the initiation of an enable signal by the keyboard (6) to makes the circuit generate operation;

a first transmission/receiving circuit (12) conducts the transmission or the receiving of the signal data keyed in at the keyboard (6);

an array detector (13) detects the signal data transmitted from the first transmission/receiving circuit (12);

a signal processor (14), via the data transmission rate circuit (15) and identifier (16), distinguishes and processes the signal data detected by the array detector (13);

a coder (17) codes and transmits the signal data distinguished and processed by the signal processor (14) to a second transmission/receiving circuit (19) and then to the receiving circuit (3) via the emitting circuit (2);

a decoder (18) receives, decodes and then transmits the coded signal data of the receiving circuit (3) via the second transmission/receiving circuit (19) to the signal processor (14) for distinguishing and processing;

an array decoder (20) further decodes and then transmits the decoded signal data distinguished and processed by the signal processor (14) via the data transmission rate circuit (15) and identifier (16), to the keyboard controller (4) through the first transmission/receiving circuit (12).

When the user operates and controls a press key on the keyboard (6), the oscillation circuit (11) initiates the enable signal to make the circuit generate operation and, via by the data transmission rate circuit (15) and identifier (16);, simultaneously conducts selective transmission or receiving for the signal data keyed in by the press key, then transmits the signal data selected for transmission into the array detector (13) for conducting the detection of the signal data transmitted by the first transmission/receiving circuit (12), then further transmits the signal data detected by the array detector (13) into the signal processor (14) and further transmits, processes and identifying by the data transmission rate circuit (15) and identifier (16); after that, the identified, transmitted and processed signal data is further transmitted to the coder (17) for conducting the coding; then, the coded signal data is transmitted to the second transmission/receiving circuit (19) for conducting the selective transmission or receiving; the selected, transmitted and coded signal data is further transmitted to the receiving circuit (3) via the emitting circuit (2); at this time, the decoder (18) decodes and then transmits the coded signal data of the receiving circuit (3) via the second transmission/receiving circuit (19) to the signal processor (14) for conducting the transmission, processing and identifying by the data transmission rate circuit (15) and identifier (16); the decoded signal data transmitted, processed and identified is further transmitted into the array decoder (20) for conducting further decoding for the decoding of the signal data; then, the latest decoded signal data is selectively transmitted and received by the first transmission/receiving circuit (12); after that, the decoded signal data selectively transmitted and decoded is transmitted to the keyboard controller (4) and then the keyboard controller (4) transmits the signal data into the computer (5) for enabling the computer (5) to operate.

The present invention of a wireless keyboard array IC is an IC product capable of saving laboring time and reducing material cost as well as having the efficiency of code transmission and receiving the decoded; its function is to code the press keys on the keyboard inside an array of 8×20 and to transmit the data by the method of serialization; it is also capable of receiving, further decoding and transmitting the decoded serial data to the keyboard controller (4); therefore, it is not limited by any different keyboard controller (4) any more; in addition, the code transmission and receiving the decoded of the present invention is composed by 170 bytes, therefore, there are many coding and decoding combinations and that relatively increases the data transmission; furthermore, when transmitting or receiving the signal data, the enable signal of the emitting circuit (2) and the receiving circuit (3) must start to transmit or receive 2 ms after it is initialed.

In summation of the foregoing sections, the present invention of a wireless keyboard array IC is specifically capable of achieving the predetermined objectives and efficiency, has not been previously disclosed, complies with all new patent requirements of being innovative and advanced and is hereby submitted to the patent bureau for review and granting of commensurate patent rights.

What is claimed is:

1. A wireless keyboard array integrated circuit (IC) device uses a wireless keyboard array IC to simultaneously conduct code transmission and receiving the decoding as well as output the signal data keyed in from the keyboard to a keyboard controller by the method of serialization and via the emitting circuit and receiving circuit, then the keyboard controller transmits the signal data into a compute; the said wireless keyboard array IC comprises:

an oscillation circuit controls the initiation of the enable signal by the keyboard to makes the circuit generate operation;

a first transmission/receiving circuit conduct the transmission or the receiving of the signal data keyed in at the keyboard;

an array detector detects the signal data transmitted from the first transmission/receiving circuit;

a signal processor, via the data transmission rate circuit and identifier, distinguishes and processes the signal data detected by the array detector;

a coder codes and transmits the signal data distinguished and processed by the signal processor to a second transmission/receiving circuit and then to the receiving circuit via the emitting circuit;

a decoder receives, decodes and then transmits the coded signal data of the receiving circuit via the second transmission/receiving circuit to the signal processor for distinguishing and processing;

an array decoder further decodes and then transmits the decoded signal data distinguished and processed by the signal processor via the via the data transmission rate circuit and identifier, to the keyboard controller through the first transmission/receiving circuit.

2. A wireless keyboard array integrated circuit (IC) according to claim 1, wherein the said wireless keyboard array IC is installed inside the keyboard.

* * * * *